July 19, 1949.   C. O. GUERNSEY   2,476,368
DEFLECTING SEPARATOR AIR SCOOP FOR
VENTILATING CLOSED VEHICLES Filed Aug. 3, 1946   5 Sheets-Sheet 1

INVENTOR
C. O. GUERNSEY
BY
Toulmin & Toulmin
ATTORNEYS

INVENTOR
C. O. GUERNSEY
BY
Toulmin & Toulmin
ATTORNEYS

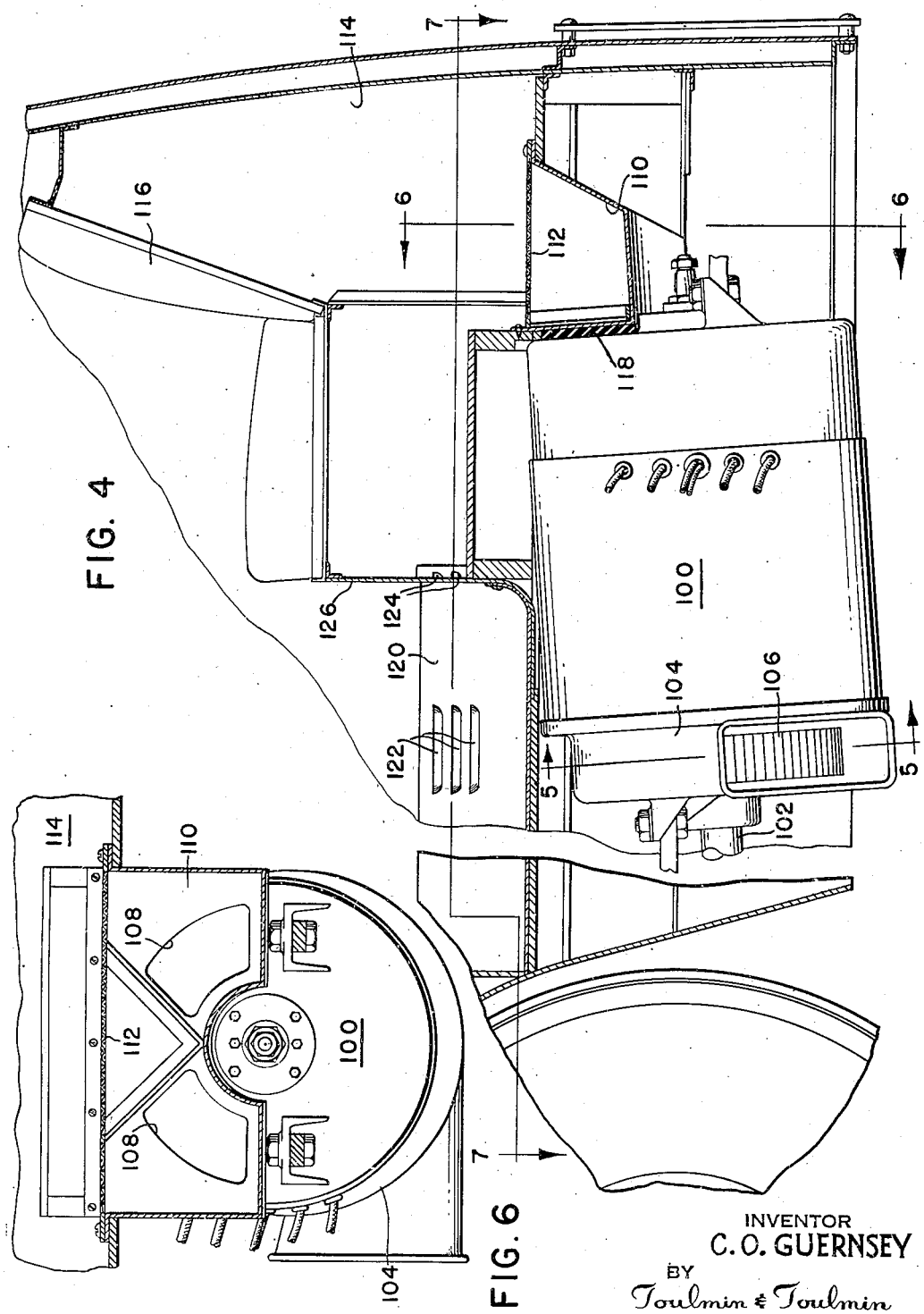

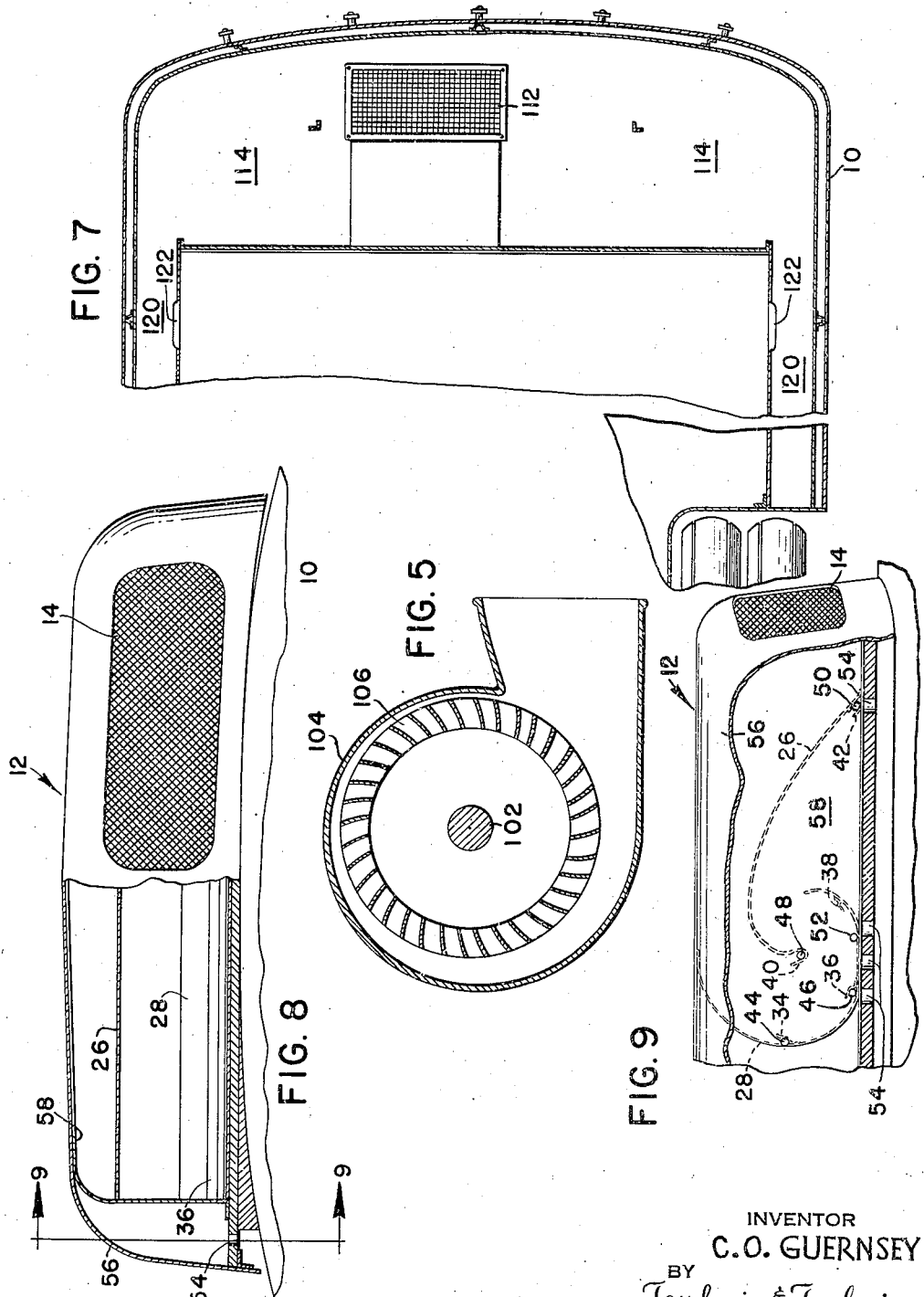

INVENTOR
C. O. GUERNSEY
BY
Toulmin & Toulmin
ATTORNEYS

Patented July 19, 1949

2,476,368

UNITED STATES PATENT OFFICE 2,476,368

DEFLECTING SEPARATOR AIR SCOOP FOR VENTILATING CLOSED VEHICLES

Charles O. Guernsey, Indianapolis, Ind., assignor to Marmon-Herrington Company, Incorporated, Indianapolis, Ind., a corporation of Indiana Application August 3, 1946, Serial No. 688,362

7 Claims. (Cl. 183—79)

This invention relates to ventilating systems for closed vehicles, and especially to such systems in connection with trolley coaches and similar conveyances.

The object of this invention is to provide an improved ventilating system for a trolley coach in which fresh air is continuously supplied to the interior of the vehicle and in which there is a continuous discharge of stale air from the said interior.

Another object is to provide a ventilating system for a vehicle such as a trolley coach wherein the fresh air supply is automatically cleaned of moisture and dust particles during the passage into the interior of the vehicle.

It is still another object to provide a ventilating system for a closed vehicle having a traction motor in which there is a ventilating fan driven by the traction motor for circulating at least part of the air passing through the vehicle.

Still another object is to provide a ventilating system for a closed vehicle such as a trolley coach or bus in which there is a uniform distribution of fresh air throughout the vehicle.

It is also an object to provide an improved heating system for a trolley coach which, in cold weather employs the starting or accelerating and braking resistors of the traction motor for heating the air.

A still further object is to provide automatic control means in connection with a ventilating system for a trolley coach or bus having a circulating fan and which is operable to selectively exhaust the said fan to the atmosphere in order to maintain the proper vehicle temperature.

It is also an object of this invention to provide a ventilating and heating system for a trolley coach wherein the air is partially heated by the resistors associated with the traction motor and partly heated by auxiliary resistors, and in which there is an automatic mechanism for controlling the auxiliary resistors.

These and other objects and advantages will become more apparent upon reference to the following description taken in connection with the accompanying drawings in which:

Figure 4 is a partial vertical section taken at the rear end of the vehicle and shows the vehicle traction motor and the connections thereto by means of which air is exhausted from the interior of the vehicle;

Figure 5 is a transverse section indicated by the line 5—5 on Figure 4 and shows the blower associated with the traction motor and which withdraws air from the vehicle;

Figure 6 is a transverse section taken on the line 6—6 of Figure 4 and shows the discharge end of the duct by means of which the traction motor cooling air passage communicates with the interior of the vehicle;

Figure 7 is a plan view indicated by the line 7—7 on Figure 4 and showing the duct connections between the interior of the vehicle and the traction motor inlet;

Figure 8 is a transverse section indicated by the line 8—8 on Figure 2 showing details of construction in connection with the air scoop;

Figure 9 is a section taken on the line 9—9 of Figure 8 and shows other details of construction in connection with the air scoop;

Structural arrangement

Figure 1:
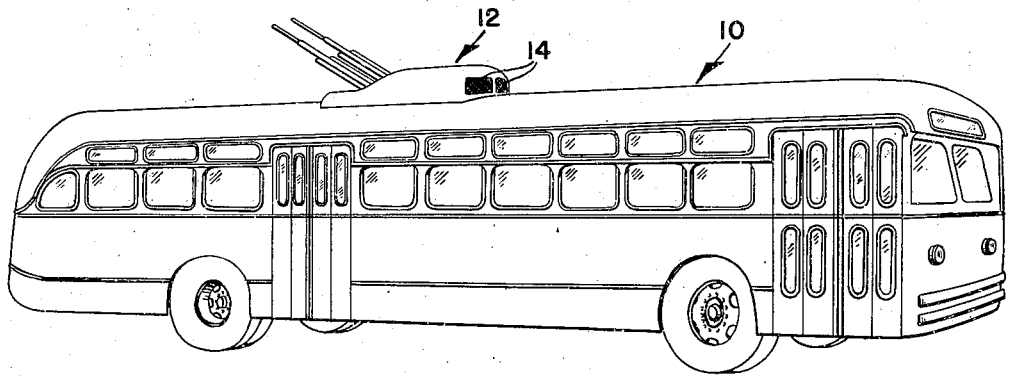
Figure 1 is a perspective view of a typical trolley coach construction adapted for being heated and ventilated according to this invention.
Figure 2:
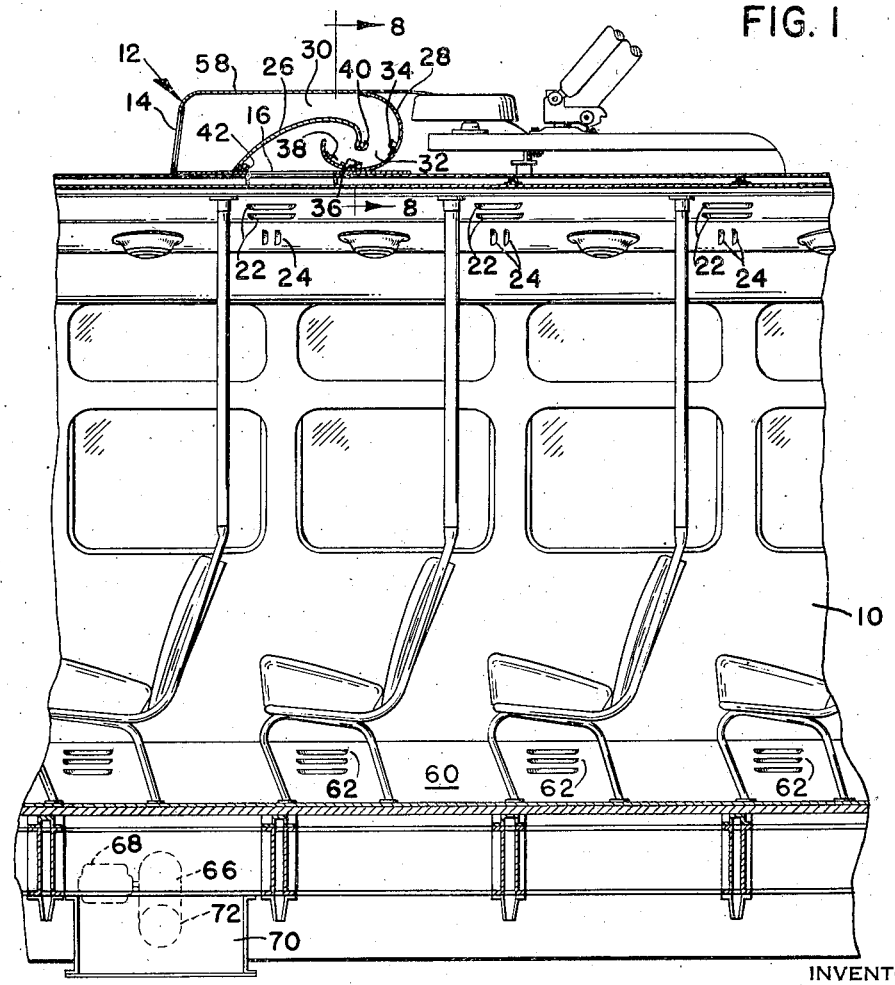
Figure 2 is a partial vertical longitudinal section through the coach showing a portion of the air circulating system.
Figure 3:
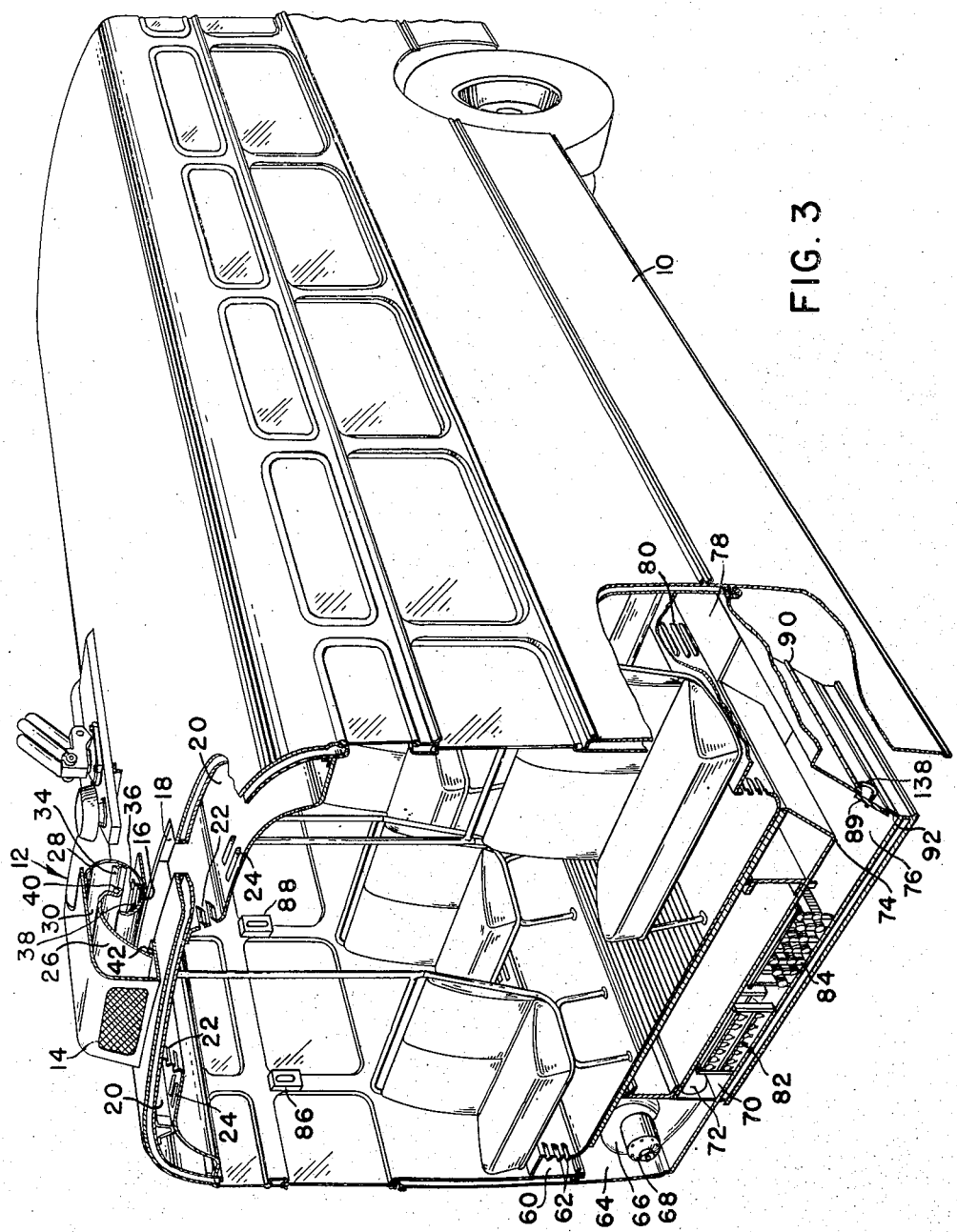
Figure 3 is a perspective view partly in section showing more in detail the circulating system including the circulating fan, the heating resistors, and the damper which controls the amount of recirculated air.
Figure 10:
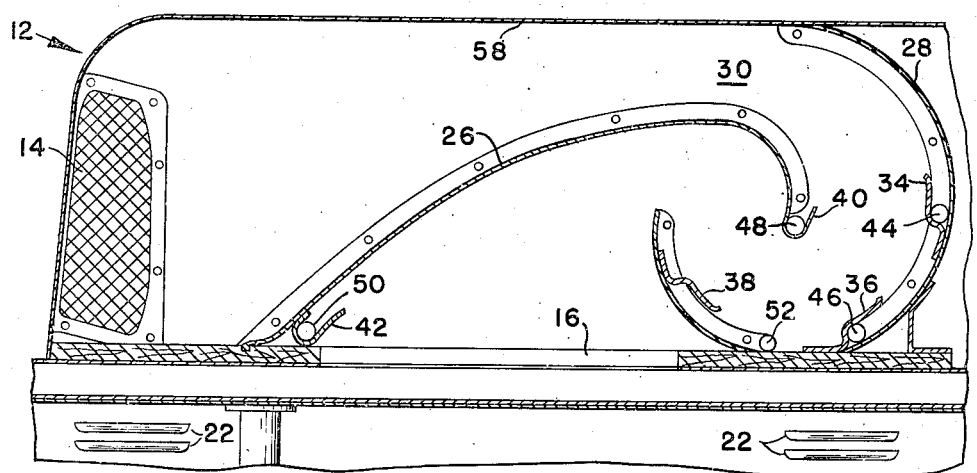
Figure 10 is an enlarged section showing in more detail the construction of the air scoop and the baffles therein and the path of the air traveling therethrough.

Referring to the drawings more particularly, 10 indicates a vehicle of a type adapted for being equipped with an air circulating and conditioning system of the present invention. Although the vehicle shown is an electric trolley coach it will be understood that this invention is adaptable for other types of vehicles having other motive powers.

The vehicle has mounted on the roof thereof, and substantially in the center, an air scoop generally indicated at 12, which is seen in section in Figures 2, 3, 8, 9 and 10. The scoop comprises the screened inlet openings 14 which open into the interior of the scoop structure and a discharge opening 16 which communicates through an aperture 18 in the vehicle roof with a pair of longitudinally extending ducts 20 which are carried along the ceiling of the vehicle at either side, and which open into the interior of the vehicle as, for example, through the louvres at 22 and 24.

The air in passing through the air scoop is deflected from a straight path and caused to swirl by a pair of scroll shaped plates 26 and 28 which extend from side wall to side wall of the scoop assembly and which define a tortuous path between the scoop inlet 14 and the scoop outlet 16. The scroll plate 26 adjacent the inlet opening 14 is formed to define a flow path for the air of reduced area as at 30, by virtue of which the air which enters the scoop is accelerated as it approaches the mouth of the aforementioned tortuous path. Thereafter, the accelerated air is deflected by the scroll plate 28 in order to pass through the path 32 between the plates and to the inlet opening 16.

As the air is deflected, the moisture and dust particles entrained therein, which also have been accelerated during the passage of the air through the reduced area section 30, are thrown outwardly in the air stream and become concentrated along the inner surface of the scroll plate 28. For collecting these particles, the scroll plate 28 is provided with a plurality of skimming blades 34, 36 and 38. Furthermore, the end of the scroll plate 26 has a skimming edge 40 and there is a still further skimming edge at 42 at the edge of the scroll plate 26. The skimming blades 34, 36, 40 and 42 all open through ports in the end walls of the scoop housing, as indicated at 44, 46, 48 and 50, respectively, in Figure 9. The other skimming blade 38 is located in such a manner that the discharge port therefor must be positioned at 52 so that the particles collected thereby can flow down the scroll plate 28 to the lowermost point thereof.

The collected foreign matter, principally water, is forced through the aforementioned openings 44 through 52, inclusive, by the air pressure which stands within the scoop housing. This expelled foreign matter is conducted to the atmosphere through the opening, or series of openings 54, in the supporting base plate for the scoop. The openings 54 fall within the fairing sheet 56 which is secured to the scoop supporting base and to the sheet 58 which forms an enclosure for the scoop.

The air which passes into the interior of the vehicle 10 from the ceiling ducts 20 through the openings 22 and 24 is at least partially collected by the floor duct 60 which has the louvres 62 opening into the vehicle interior. The duct 60 extends longitudinally of the vehicle, terminating, as will become apparent subsequently, at the forward side of the center door. The duct 60 opens into an enclosure or cabinet 64 within which there is mounted a centrifugal fan 66 having a drive motor 68.

The inlet of the fan 66 opens directly into the enclosure 64 to withdraw air therefrom and the discharge thereof opens into an enclosure 70 as at 72.

The enclosure, or channel, 70 extends transversely across the vehicle and opens through an aperture 74 into a short vertical passage 76 which, in turn, opens into the floor duct 78 extending longitudinally along the vehicle at the side opposite the duct 60. The duct 78 includes the openings or louvres 80 by means of which the air supplied to the duct is returned to the interior.

Within the channel 70 there is the resistor bank 82 which forms at least a portion of the starting, running, and braking resistors which are normally in circuit with the traction motor of the vehicle. These resistors may be of any type, either cast or wound and are placed in the channel 70 to give up the heat developed therein to the air stream passing from the blower 66.

A second resistor bank at 84 is also located in the channel 70 and, as will become apparent hereinafter, is under the control of the thermostat 86 which may be suitably located within the vehicle as, for example, on the side wall. When necessary, the resistor bank 84 is energized to supply additional heat to the air stream.

The end of the channel 70 is normally closed by a damper plate 89 which is hinged at 90 and which is movable into position to close the aperture 74 while opening the aperture 92. When the damper is so moved, the air discharged by the blower 66 passes directly to the atmosphere. The damper 89 is preferably automatically controlled and such control is exemplified by the thermostat 88 which may be a portion of or separate from the resistor controlling thermostat 86.

Additional air circulation through the vehicle is provided by withdrawing air from the interior thereof by the vehicle traction motor. This portion of the air circulating system is best seen in Figures 4, 5, 6 and 7. In Figure 4 the traction motor of the vehicle is indicated at 100 and it may be connected with the vehicle drive wheels by a shaft 102 through suitable gear reduction units if desired. The motor 100 is adapted for being cooled by a current of air passing therethrough and to this end, there is mounted on the motor a fan unit consisting of a housing 104 and an impeller 106. When the motor is rotated, the impeller 106 draws air leftwardly, as viewed in Figure 4, through the motor housing and exhausts to the atmosphere.

Referring to Figures 4 and 6, it will be noted that the end of the housing of the motor 100 opposite the fan unit has therein the apertures 108 which open into a duct 110 which communicates through the screen 112 with a chamber 114 behind the rear seat 116 of the vehicle. For preventing leakage between the duct 110 and the motor housing, there may be provided the resilient gasket means at 118 which is compressed when the said motor and duct are secured together.

The chamber 114 behind the seat 116 extends under the said seat and transversely into communication with a pair of floor ducts 120 having the louvre openings 122. As will be seen in Figures 4 and 7, the floor ducts 120 terminate at the rear wheel housing. The chamber 114 also communicates with the interior of the vehicle through the louvres 124 in the panel 126 at the front edge of the seat 116.

While the blower 66 and the fan unit on the traction motor may vary considerably in size, for the ordinary trolley coach it has been found that a capacity of 1,000 cubic feet per minute is ample for the circulating blower 66, while the blower on the traction motor will vary between zero discharge when the vehicle is stationary to about 1,800 cubic feet per minute when the vehicle is moving at maximum speed.

It will be apparent that there is always a continuous circulation of 1,000 cubic feet per minute either within or through the vehicle; while, depending on the rate of speed of the vehicle, there is an additional movement of up to 1,800 cubic feet per minute of the air from the vehicle interior to the atmosphere.

Figure 11:
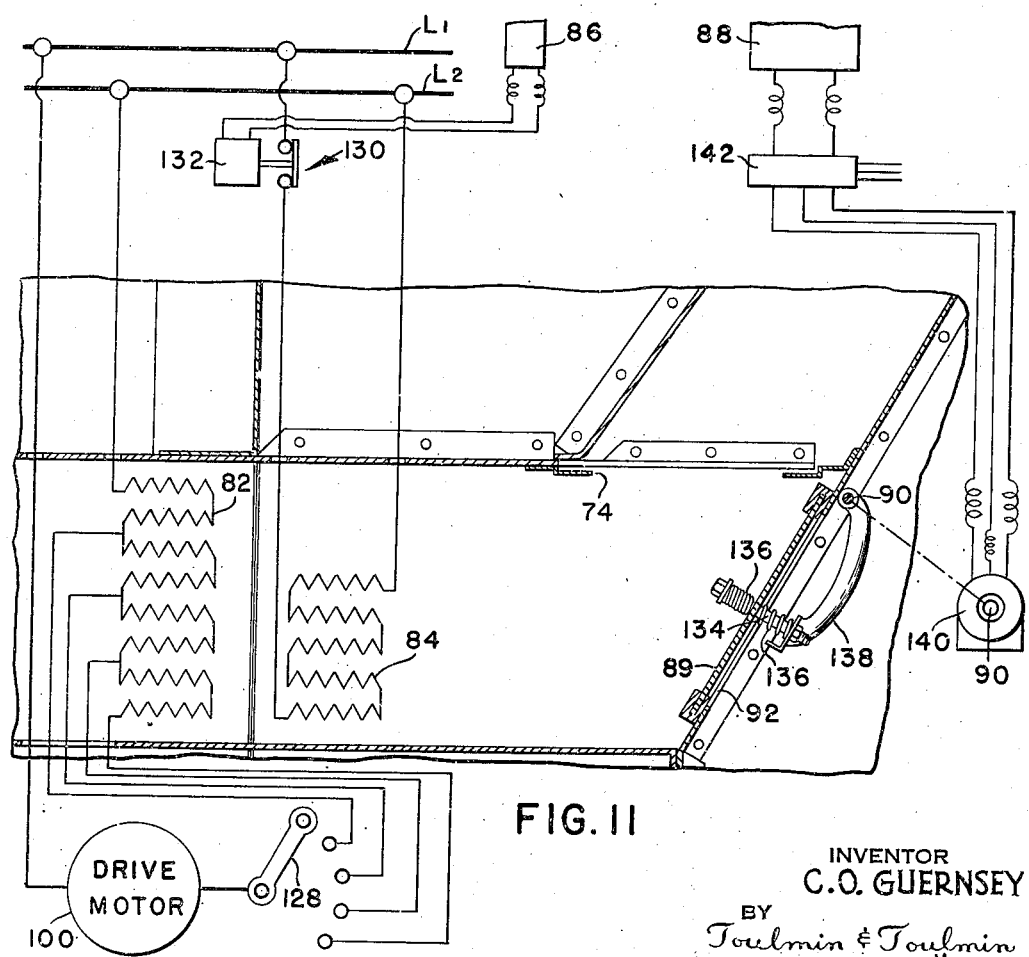
Figure 11 is a diagrammatic view showing the electrical controls in connection with the resistance heaters and also the controls in connection with the bypassing damper.

Figure 11 illustrates a typical electrical circuit which may be employed with the construction of the present invention. In this view the power lines are indicated at L1 and L2 and probably comprise either 550 or 600 volt direct current supply lines. Connected between the lines L1 and L2 and in circuit with the drive motor 100 is the resistor bank 82. This resistor bank is shown as being tapped in a plurality of places and with the taps connected to the terminals of a sweep switch 128. It will be understood that the circuit illustrated is only exemplary in that the resistors could be connected in circuit with the motor in several other manners in order to provide for speed control thereof, braking, accelerating, etc. in the usual manner.

Also connected between the lines L1 and L2 is the heating resistor bank 84, in series with which is a switch 130 which is controlled by an instrumentality at 132 which is connected to be actuated by the thermostat 86. The thermostat 86 may be adjusted to either maintain the switch 130 normally open or normally closed according to the individual preference and forms no part of the present invention except insofar as the function thereof is employed for connecting and disconnecting the resistors 84 from the power supply lines.

Figure 11 also illustrates one manner of controlling the damper 89 which is pivoted at 90. This damper construction may consist of the damper plate proper at 89 which is carried on the stud 134 between the springs 136. The stud 134 is mounted on the end of an arm 138 which is connected to be driven by a motor 140. The springs 136 permit the damper plate to accommodate itself to the flanges surrounding the apertures 92 and 74 in order to effect a good seal thereof to prevent leakage of air.

The motor 140 is connected with an electric power supply through switch 142 which is connected to be controlled by the thermostat 88. As in the case of the thermostat 86 and the mechanism at 132, the thermostat 88 and the switch 142 form in themselves no part of the present invention but are of importance as regards their function.

It will be apparent that the present invention provides an improved ventilating and air heating system for enclosed vehicles and a system which is particularly well adapted for use in connection with electrically driven coaches such as trolley coaches.

By means of the present invention a continuous and clean supply of fresh air is provided. The stale air is continuously exhausted, and a certain portion of the air within the vehicle is either recirculated and has the temperature thereof closely controlled or is exhausted, and is utilized during the said exhausting for cooling the operating resistors associated with the traction motor.

It will be understood that this invention is susceptible to modification in order to adopt it to different usages and conditions and, accordingly, it is desired to comprehend such modifications within this invention as may fall within the scope of the appended claims.

I claim:

1. An air scoop adapted for mounting on the roof of a vehicle, comprising a casing having a front end provided with an inlet opening, a top, a base having a discharge opening, a pair of spaced curved plate means in said casing defining a scroll, one of said plate means extending slantingly upwardly over said discharge opening from a point rearwardly of said inlet opening and toward said top to define with said top a gradually restricted passageway extending rearwardly of said opening, said plate means having a downwardly curved rear end, said other plate means being in the shape of a partial circle in cross-section with its upper end attached adjacent to said top and its lower end extending upwardly towards but spaced from the under side of said first-named plate means, said upwardly extending lower end forming a baffle and being located rearwardly of said discharge opening, and means in said casing for collecting moisture.

2. An air scoop adapted for mounting on the roof of a vehicle, comprising a casing having a front end provided with an inlet opening, a top, a base having a discharge opening, a pair of spaced curved plate means in said casing defining a scroll, one of said plate means extending slantingly upwardly over said discharge opening from a point rearwardly of said inlet opening and toward said top to define with said top a gradually restricted passageway extending rearwardly of said opening, said plate means having a downwardly curved rear end, said other plate means being in the shape of a partial circle in cross-section with its upper end attached adjacent to said top and its lower end extending upwardly towards but spaced from the under side of said first-named plate means, said upwardly extending lower end forming a baffle and being located rearwardly of said discharge opening, and means on at least one of said plate means for collecting dust particles.

3. An air scoop adapted for mounting on the roof of a vehicle, comprising a casing having a front end provided with an inlet opening, a top, a base having a discharge opening, a pair of spaced curved plate means in said casing defining a scroll, one of said plate means extending slantingly upwardly over said discharge opening from a point rearwardly of said inlet opening and toward said top to define with said top a gradually restricted passageway extending rearwardly of said opening, said plate means having a downwardly curved rear end, said other plate means being in the shape of a partial circle in cross-section with its upper end attached adjacent to said top and its lower end extending upwardly towards but spaced from the under side of said first-named plate means, said upwardly extending lower end forming a baffle and being located rearwardly of said discharge opening, and means on at least one of said plate means for collecting dust particles, said last-named means comprising skimming blades.

4. An air scoop adapted for mounting on the roof of a vehicle, comprising a casing having a front end provided with an inlet opening, a top, a base having a discharge opening, a pair of spaced curved plate means in said casing defining a scroll, one of said plate means extending slantingly upwardly over said discharge opening from a point rearwardly of said inlet opening and toward said top to define with said top a gradually restricted passageway extending rearwardly of said opening, said plate means having a downwardly curved rear end, said other plate means being in the shape of a partial circle in cross-section with its upper end attached adjacent to said top and its lower end extending upwardly towards but spaced from the under side of said first-named plate means, said upwardly extending lower end forming a baffle and being located rearwardly of said discharge opening, and means for collecting dust particles and moisture comprising skimming means located on the downwardly curved rear end of said first-named plate means.

5. An air scoop adapted for mounting on the roof of a vehicle, comprising a casing having a front end provided with an inlet opening, a top, a base having a discharge opening, a pair of spaced curved plate means in said casing defining a scroll, one of said plate means extending slantingly upwardly over said discharge opening from a point rearwardly of said inlet opening and toward said top to define with said top a gradually restricted passageway extending rearwardly of said opening, said plate means having a downwardly curved rear end, said other plate means being in the shape of a partial circle in cross-section with its upper end attached adjacent to said top and its lower end extending upwardly towards but spaced from the under side of said first-named plate means, said upwardly extending lower end forming a baffle and being located rearwardly of said discharge opening, and means for collecting dust particles and moisture comprising a plurality of skimming blades located on both plate means.

6. An air scoop adapted for mounting on the roof of a vehicle, comprising a casing having a front end provided with an inlet opening, a top, a base having a discharge opening, a pair of spaced curved plate means in said casing defining a scroll, one of said plate means extending slantingly upwardly over said discharge opening from a point rearwardly of said inlet opening and toward said top to define with said top a gradually restricted passageway extending rearwardly of said opening, said plate means having a downwardly curved rear end, said other plate means being in the shape of a partial circle in cross-section with its upper end attached adjacent to said top and its lower end extending upwardly towards but spaced from the under side of said first-named plate means, said upwardly extending lower end forming a baffle and being located rearwardly of said discharge opening, and means for collecting dust particles and moisture comprising a plurality of skimming blades located on both plate means, one of said skimming blades being located on the forward under side of said first-named plate means adjacent to said discharge opening.

7. An air scoop adapted for mounting on the roof of a vehicle, comprising a casing having a front end provided with an inlet opening, a top, a base having a discharge opening, a pair of spaced curved plate means in said casing defining a scroll, one of said plate means extending slantingly upwardly over said discharge opening from a point rearwardly of said inlet opening and toward said top to define with said top a gradually restricted passageway extending rearwardly of said opening, said plate means having a downwardly curved rear end, said other plate means being in the shape of a partial circle in cross-section with its upper end attached adjacent to said top and its lower end extending upwardly towards but spaced from the under side of said first-named plate means, said upwardly extending lower end forming a baffle and being located rearwardly of said discharge opening, and means for collecting dust particles and moisture comprising a plurality of skimming blades located on both plate means, one of said skimming blades being located on the forward under side of said first-named plate means adjacent to said discharge opening, and other of said skimming blades being located at the lower end of said first-named plate means and on the curved interior of said other plate means.

CHARLES O. GUERNSEY.

REFERENCES CITED

The following references are of record in the file of this patent:

UNITED STATES PATENTS

| Number | Name | Date |
|---|---|---|
| 647,507 | Moore | Apr. 17, 1900 |
| 841,049 | Roake | Jan. 8, 1907 |
| 1,437,709 | Bender | Dec. 5, 1922 |
| 1,643,966 | Swartwout | Oct. 4, 1927 |
| 1,990,753 | Rapp | Feb. 12, 1935 |
| 1,993,521 | Parsons | Mar. 5, 1935 |
| 2,034,955 | Parsons | Mar. 24, 1936 |
| 2,040,951 | Parsons et al. | May 19, 1936 |
| 2,058,252 | Parsons | Oct. 20, 1936 |
| 2,107,193 | Woodhams | Feb. 1, 1938 |
| 2,130,131 | Hirshfeld | Sept. 13, 1938 |
| 2,178,644 | Piron | Nov. 7, 1939 |
| 2,213,016 | Perkins | Aug. 27, 1940 |
| 2,232,587 | Brandt | Feb. 18, 1941 |
| 2,268,502 | Browne | Dec. 30, 1941 |
| 2,271,158 | Browne | Jan. 27, 1942 |
| 2,275,120 | Williams | Mar. 3, 1942 |
| 2,287,215 | Williams | June 23, 1942 |
| 2,339,441 | Turner | Jan. 18, 1944 |
| 2,351,096 | Blue | June 13, 1944 |